United States Patent
Waddington et al.

(10) Patent No.: US 9,098,726 B2
(45) Date of Patent: Aug. 4, 2015

(54) SCALABLE AND SECURE APPLICATION RESOURCE MANAGEMENT AND ACCESS CONTROL FOR MULTICORE OPERATING SYSTEMS

(71) Applicant: Samsung Electronics Co., Ltd., Suwon, Gyeonggi-Do (KR)

(72) Inventors: Daniel G. Waddington, Morgan Hill, CA (US); Chen Tian, Union City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 13/648,157

(22) Filed: Oct. 9, 2012

(65) Prior Publication Data
US 2013/0283368 A1 Oct. 24, 2013

Related U.S. Application Data

(60) Provisional application No. 61/637,739, filed on Apr. 24, 2012.

(51) Int. Cl.
*G06F 7/04* (2006.01)
*G06F 21/71* (2013.01)

(52) U.S. Cl.
CPC ...................................... *G06F 21/71* (2013.01)

(58) Field of Classification Search
CPC ....................................................... G06F 21/71
USPC .................... 726/1–2, 17; 713/164, 168, 176
See application file for complete search history.

(56) References Cited

U.S. PATENT DOCUMENTS

| | | | |
|---|---|---|---|
| 7,509,497 B2 * | 3/2009 | Joy et al. | 713/172 |
| 2003/0051169 A1 | 3/2003 | Sprigg et al. | |
| 2005/0223382 A1 * | 10/2005 | Lippett | 718/103 |
| 2007/0157211 A1 | 7/2007 | Wang et al. | |
| 2008/0163366 A1 | 7/2008 | Chinya et al. | |
| 2009/0210702 A1 * | 8/2009 | Welingkar et al. | 713/156 |
| 2009/0260004 A1 | 10/2009 | Datta et al. | |
| 2009/0288084 A1 * | 11/2009 | Astete et al. | 718/1 |
| 2010/0131956 A1 * | 5/2010 | Drepper | 718/104 |
| 2010/0138830 A1 * | 6/2010 | Astete et al. | 718/1 |

FOREIGN PATENT DOCUMENTS

KR 1020050039661 A 4/2005

OTHER PUBLICATIONS

Banga, Gaurav et al., "Resource Containers: A New Facility for Resource Management in Server Systems," USENIX, Proceedings of the 3$^{rd}$ Symposium on Operating Systems Design and Implementation, New Orleans, LA, Feb. 1999, 15 pages.

(Continued)

*Primary Examiner* — Samson Lemma
(74) *Attorney, Agent, or Firm* — Sherman IP LLP; Kenneth L. Sherman; Hemavathy Perumal

(57) ABSTRACT

An architecture for multi-core and many-core processor systems includes a set of resource managers having a hierarchy of at least one level. The resource managers act as trusted proxies for the operating system (OS) kernel to manage resources for applications. The application may include a trusted secure specification defining resource and access privileges of the associated application.

20 Claims, 3 Drawing Sheets

(56) References Cited

OTHER PUBLICATIONS

Hamilton, Graham et al., "The Spring nucleus: A microkernel for objects," Proceedings of 1993 Summer USENIX Conference, Jun. 1993, 14 pages.

Ford, Bryan et al., "Evolving Mach 3.0 to a Migrating Thread Model," Proceedings of 1994 Winter USENIX Conference, Jan. 1994, 18 pages.

Feske, Norman et al., "Design of the Bastei OS Architecture," Jan. 4, 2007, Institute for System Architecture, Operating Systems Group, TUD-FI06-07 Dec. 2006, 21 pages.

"Assembly Manifest, .NET Framework 1.1," http://msdn.microsoft.com/en-us/library/1w45z383(d=printer,v=vs.71).aspx.

International Search Report mailed Aug. 20, 2013 for International Application No. PCT/KR2013/003295 from Korean Intellectual Property Office, pp. 1-3, Seo-gu, Daejeon, Republic of Korea.

European Search Report dated Nov. 10, 2014 for European Application No. 13164049.2 from European Patent Office, pp. 1-10, Munich, Germany.

* cited by examiner

SCALABLE AND SECURE APPLICATION RESOURCE MANAGEMENT AND ACCESS CONTROL FOR MULTICORE OPERATING SYSTEMS

CROSS REFERENCE TO RELATED APPLICATIONS

This application claims the benefit of U.S. Provisional Application No. 61/637,739 filed on Apr. 24, 2012, the contents of which are hereby incorporated by reference.

FIELD OF THE INVENTION

The present invention is generally related to trusted management of resources in a multi-core or many-core processor.

BACKGROUND OF THE INVENTION

The role of the operating system (OS) in a computing system is to manage resources in the underlying hardware platform, and expose these resources to the application through software APIs. Examples of resources managed by the OS include virtual and physical memory, CPUs/processor cores (tasks and threads), IO devices (expansion cards) and interrupts (IRQs, ICUs). Within the context of multi-core and many-core processors, it is the OS's responsibility to manage concurrent access to shared resources, both with respect to serialization (e.g., through lock protection) and multiplexing (e.g., scheduling).

Operating systems vary in their design depending on the domain/role that they are being used in. For example, an OS that is used for real-time sensor management is structured differently from an OS that is being used in a desktop PC workstation. A real-time OS (RTOS) incorporates strict resource management with the primary concern of ensuring that computation and IO can be achieved within well-defined temporal bounds. Applications that are deployed on RTOS (e.g., avionics systems, health devices, energy management systems) require extensive analysis of the resources they require, including detailed calculation of CPU (e.g., Worse Case Execution Time—WCET) and memory (e.g. potential stack and heap memory size). That is, successful operation relies upon up-front allocation of resources prior to deployment. When accurate prediction of application resource requirements cannot be achieved, the system designer must over-allocate resources, which can potentially result in waste.

Alternatively, an OS that is functioning within the domain of desktop applications (e.g., Microsoft Windows®, Linux, Oracle Solaris®) manages resources within the OS with the aim of optimizing total throughput of the system. Thus, in such an OS, making guarantees with respect to time is generally not possible—resources are often over-committed and the exact QoS (Quality-of-Service) is not deterministic and therefore cannot be readily predicted.

To summarize this point, traditional OSs are generally designed and optimized for a single-role with concern for either throughput or time. State-of-the-art OSs do not do well managing multiple applications that have different roles—i.e., they are not multi-role.

Another important observation is that single-role OSs cannot be easily adapted to multi-role. This is primarily because of the fundamental differences in the underlying resource management model. In mainstream OSs, such as Linux, Windows® and Solaris®, applications are free to request resources on demand. Furthermore, permission to request resources from the system is implicitly given to all applications—for example, all applications are free to create threads and request allocation of memory.

Monolithic OS designs (e.g., Linux, Windows®, Solaris®) generally provide a two-level security hierarchical; kernel-mode (trusted) and user-mode (untrusted). Program code that is running in kernel-mode has privileges necessary to obtain access to all resources in the system, including interrupts and I/O memory—these can be termed "unsafe resources" since misuse of them can result in total system failure. Alternatively, user-level code generally only has permission to access "safe resources" such as heap memory, threads, processes etc.

Microkernel designs are different from their monolithic counterparts by the fact that access to "unsafe resources" can be given to user-level code. Much of the functionality that traditionally resides in the monolithic kernel (e.g., networking, IO) is moved into the user space. So, a problem that naturally arises is that prior art techniques are inadequate to manage access of a microkernel-based OS and permissions to resources in order to maintain integrity of the system.

With the advent of multi-core and many-core processors, microkernel designs are becoming more significant due to their inherent ability to decouple system services and applications. Particularly, they lend themselves to designs that decentralize system services such as memory management, page-faulting handling, device 10 and so forth. As the compute capability for devices increases (reaching 100-1000 cores in the next 10 years), the potential for devices to perform multi-role functions also become apparent. However, parallel processors bring with them the need to scale the OS so that applications executing on multiple cores can interact with the OS, without interfering with each other, or having performance degraded as a result of forced serialized access. Thus, another problem arises because of the issues in performing resource management scheme that is scalable, and safely meets the needs of multi-core and many-core systems.

SUMMARY OF THE INVENTION

Software applications are provided with a trusted manifest specifying resource quotas and access control information (with respect to software services) for the application. This trusted manifest is used for resource management during runtime of the application. Applications which do not have a trusted manifest may be denied access to resources and/or software services. Additionally, fine grained resource control may be based on the trusted manifests.

In one embodiment, a set of resource managers are provided according to a hierarchy, including at least one level. Applications are denied direct access to the kernel and to the root of the resource management trust chain. Individual resource managers are delegated the task of checking the trusted manifest of individual applications, and managing resource access by applications.

DETAILED DESCRIPTION

Figure 1:
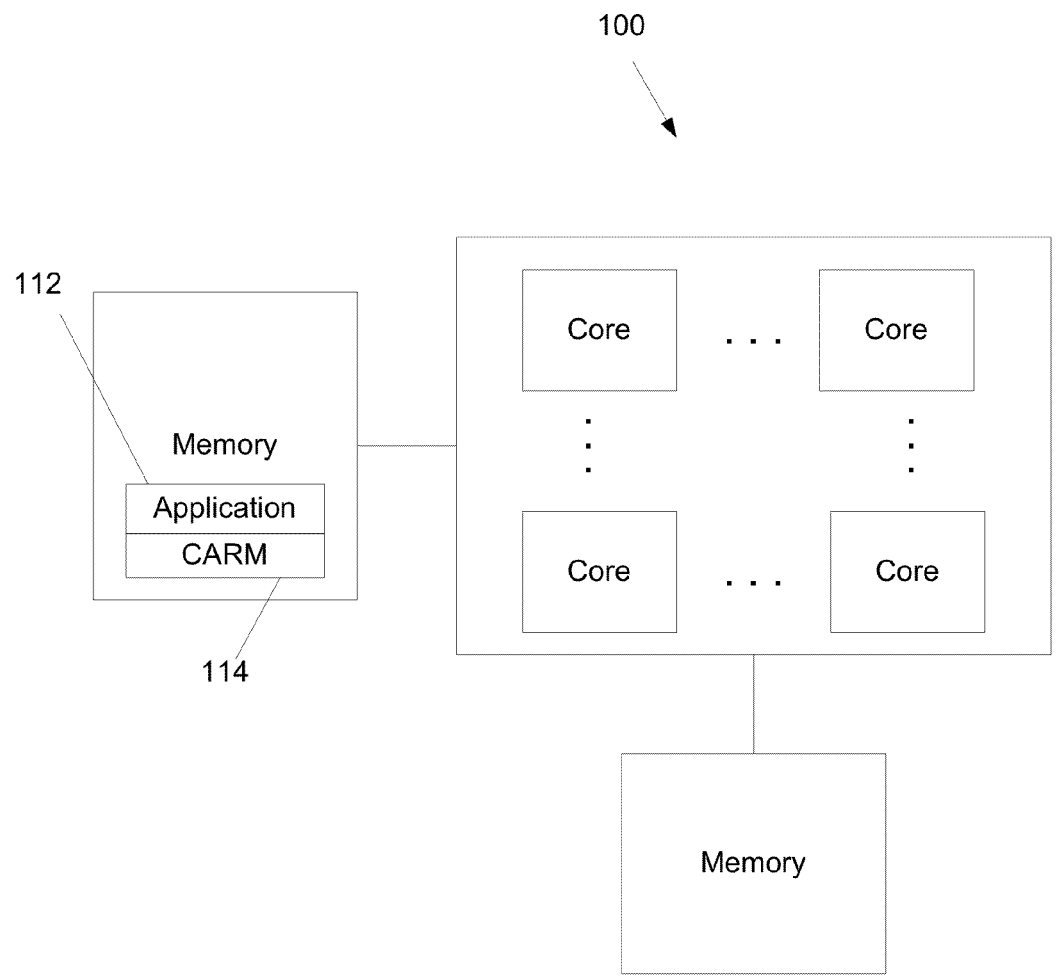
FIG. 1 illustrates an exemplary system including multiple processing cores in accordance with an embodiment of the present invention.

The present invention is directed to improved resource management in a computing system, particularly for many-core or multi-core processor systems. FIG. 1 illustrates an exemplary many-core or multi-core processor system 100 having a set of processor cores and electrical signal connections to external memories, in accordance with an embodiment of the invention. Each core generally corresponds to a CPU with associated hardware. The OS includes a kernel (monolithic or microkernel) above the hardware layer, any necessary middleware, and software applications.

The number of processors in FIG. 1 is arbitrary, as indicated by the dots between cores, as is the external memory configuration. In a many-core or multi-core processing system, there are multiple threads of execution resulting in various resource management concerns. For example, in multi-core and many-core processors, contention is interference caused by concurrent access to the same resource, causing a delay due to serialization. Crosstalk is indirect interference caused by access to separate resources resulting from hidden dependencies in the system. Contention and crosstalk affect a system's ability to deliver consistent Quality-of-Service (QoS).

In accordance with an embodiment of an invention, an application 112 includes an attached Certified Access-control and Resource Manifest (CARM) 114 to establish a trusted specification of potential resources that are required by the application as well as to an entity or entities managing resources within the system 100. For example, the CARM may be written in a language such as XML, compressed, signed, and attached (e.g. as a special binary file section) as a manifest. The CARM thus improves security and resource management.

Figure 2:
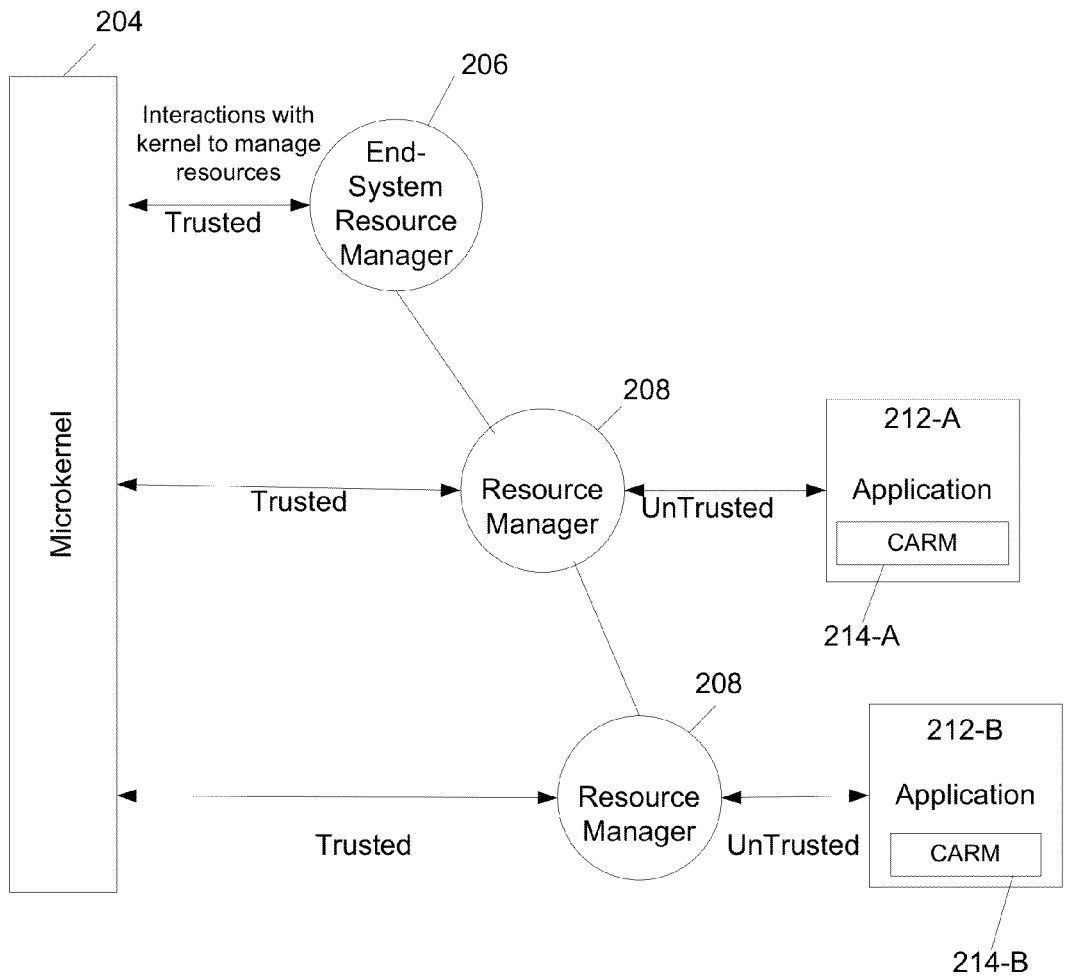
FIG. 2 illustrates resource management using resource managers in accordance with an embodiment of the present invention.

The CARM could be used with either a traditional (monolithic) kernel or a microkernel environment in order to improve resource management. A microkernel is the preferred embodiment due to its decentralized architecture. FIG. 2 illustrates a microkernel and application level view of the operation of the system 100 based on how software applications access resources. Referring to FIG. 2, software applications run on the system. An individual processing thread of an application may require a resource that the OS manages, where examples of a resource include a processor (e.g. a time slices of the cores), memory (e.g., I/O memory, heap memory, stack memory or cache memory), on chip, hardware device, software services, or other resources. As other examples of resource management, resource management may include controlling allocation of kernel objects (e.g., threads, semaphores, IPC gates), as well as resources used for communication (e.g., GPIO, IO APIC, PCI/ISA/bus channel).

An individual application 212-A or 212-B may also use its corresponding CARM to establish trust with a resource manager 208, and to also specify potential resource demand by the application. The CARM 214 is a secure (digitally signed) specification defining resource and access privileges of the associated application. As illustrated in the figures, in one embodiment, there is at least one level of hierarchy, although more generally, there may be more than one level of hierarchy. In one embodiment, one of the resource managers is an end-system manager 206.

The kernel and resource managers are part of a trusted computing base (TCB) of the platform. In one embodiment, the resource managers do not share the same address space (different memory protection domains). Each resource manager is preferably isolated in a separate process (thus the design lends itself to microkernel architectures). The resource managers 208 isolate applications from global resource management and from direct access to the kernel.

In one embodiment, the end-system resource manager 206 may be designated as a system wide entity to act as the root of the resource management tree, and be responsible for the highest level of resource coordination and partitioning between the resource managers 208 and delegate the management of resource chunks to the resource managers 208. The end-system resource manager 206 may instantiate the other resource manager 208 at boot time. Applications may also be denied direct access to the end-system resource manager 206 to further improve security of the process. Coarse resource management may be performed at a kernel level.

Each resource manager is part of a trusted computing base in that it is: 1) trusted to (a) not violate/exceed quotas and access controls defined by an application's CARM, and (b) prevent attempts by an application to cause denial-of-service in other applications (e.g., by throttling requests). It is the responsibility of the resource manager to manage the application's access to resources according to defined quotas. It is the responsibility of the resource manager to prevent or deny access to other software services in the system according to defined privileges.

The resource managers 208 provide APIs to the applications 212 in order to reserve, access and free resources. Only resource managers 208 have the necessary privileges to request resources from the OS kernel. That is, individual applications do not have sufficient privileges to directly access the kernel. The kernel will refuse direct requests from untrusted entities such as the applications 212. This permits each resource manger 208 to interact directly with a microkernel to request resources, thus improving security and also manage resources. Thus, a resource manager 208 checks the CARM of an application before granting access to resources and/or services, and an application not having a CARM would be rejected service by a resource manager.

As also illustrated in FIG. 2, there may be more than one resource manager 208. This facilitates scalability in a many-core or multi-core processor design because the number of resource managers may be adapted for a particular design.

Applications do not have direct access to either the kernel or to higher level (beyond immediate parent) resource managers. This arrangement enhances security and prevents the potential for QoS interference and crosstalk between applications.

In one embodiment, resource management in each resource manager is decentralized so that resources that have non-uniform access properties (e.g., memory, CPUs) can be separated out. To facilitate this, each resource manager maintains a number of threads of execution that redirect resource requests to different Resource Allocators (RAs). RAs exist for each type of resource in the system (thread, process, memory, IPC gate, semaphore, IRQ objects, and ICU objects). They manage a strict quota of resources that is provisioned to the resource manager by the end-system resource manager during start-up.

Figure 3:
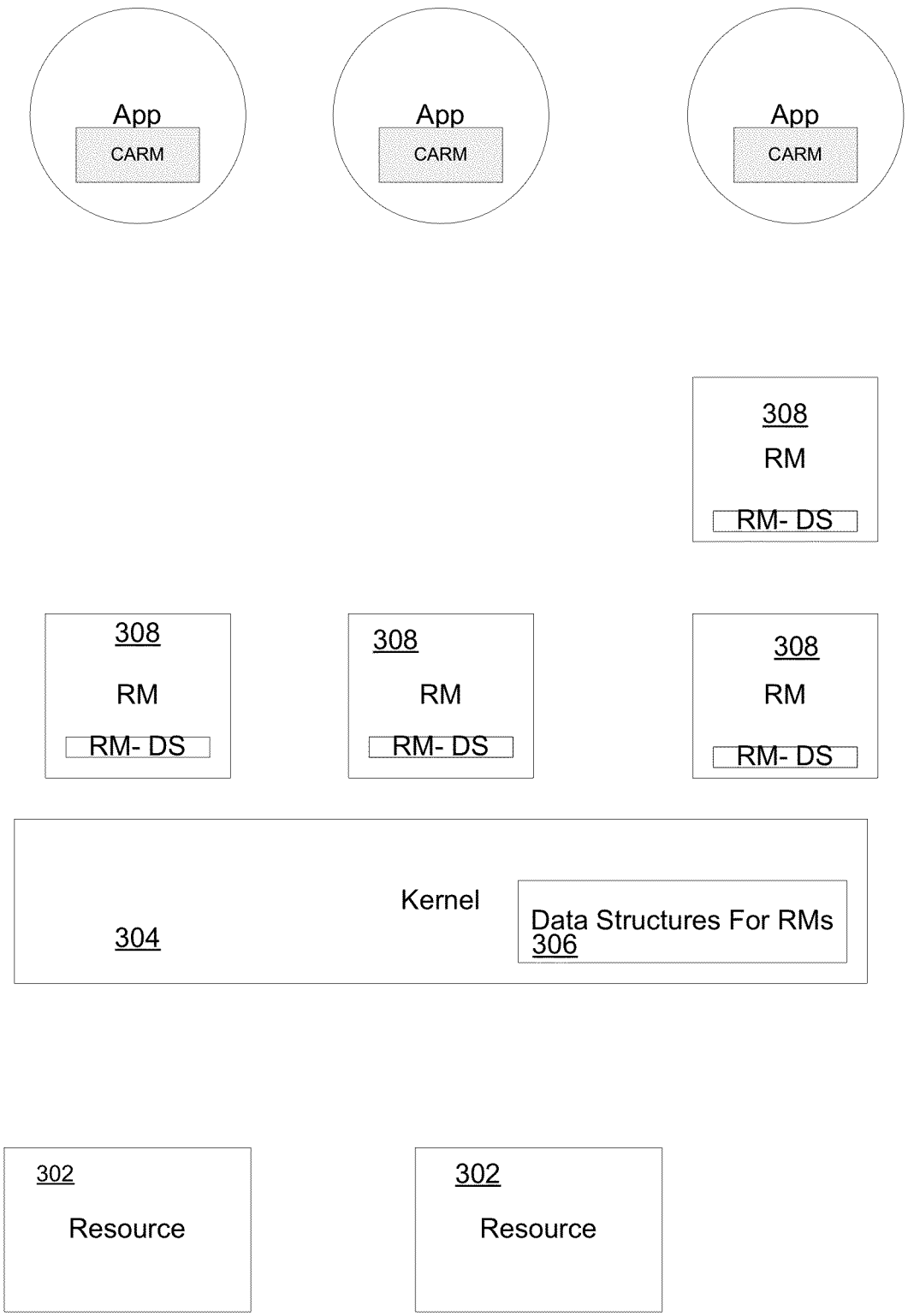
FIG. 3 illustrates additional aspects of resource management in accordance with an embodiment of the present invention.

FIG. 3 provides another view at a kernel level showing a kernel 304, data structures 306 in the kernel to support resource managers 308, individual resource managers 308 with associated local limited version of supporting data structures (DS) for the resource managers, and resources 302.

The resource managers provide an approach that is scalable and secure in a decentralized design that supports multi-core and many-core processor systems, reduces the potential for crosstalk between applications, and provides fine-grained control of resource accounting and access control. Since the number of resource managers can be increased if needed, the design id inherently scalable. Additionally, the use of the CARM permits resource accounting and improved access control. The CARM permits fine-grained definition and resource control to be implemented at runtime by providing guidance on what resources the application actually requires at runtime under normal (acceptable) conditions. Any attempt by an application to access more resources that are defined, or access software services that are not defined, will be contained. A specific situation that may lead to such a scenario is the execution of an erroneous application or a malicious application (e.g., software virus).

The resource managers act as trusted proxies. This hierarchical arrangement of trusted proxies provide a scalable means to manage access control to the kernel. The use of trusted proxies to prevent direct access of applications to centralized system services (e.g., the kernel) prevents application quality of service (QoS) cross-talk, and may also prevent denial-of-service attacks by an application on the system.

In one embodiment, system resources are divided between resource managers. Resources can be exchanged between managers in the advent of resource shortage by a specific manager. Load-balancing can be implemented either between peer managers or via a parent manager.

Resource managers are preferably multithreaded so that threads executing on multiple cores can invoke the services of the resource manager without communicating across microprocessor cores (same-core communications are in the general case higher performing that cross-core communications).

In one embodiment, the application's CARM is a digitally signed resource/permissions specification that is attached to the application (e.g., as a special binary file section). During the loading of the application, the attached CARM is made accessible to the resource manager that is associated with the application. The CARM digital signature is verified to ensure authenticity of the manifest.

While an application may have a fixed assignment to a resource manager, more generally, more than one application may be assigned to a resource manager. It will also be understood the allocation may be made by various factors, such as: based on which resources a resource manager has been authorized to provide access to, and/or for the situation that a resource manager is delegated control over only a limited set of resources.

The CARM specifies what resources (e.g., device, memory bank), and how much of the resource (i.e., a quota), an application is "allowed" to request. As an application makes resource requests to its local resource manager, the resource manager both interacts with the kernel directly to facilitate the request, and also maintains a local quota and allocation count for the resource.

CARMs specify resource quotas (e.g., CPU, memory), and may also specify service access information (e.g., Real-time Clock) for each application. Because the CARM is signed (and thus authenticated), resource managers can enable access/allocate resources according to the CARM specification. Additionally, the CARM may also include incorporation of both wildcard specifications (e.g., IO port range), as well as indirect specifications (e.g., IO memory used by device X).

As an illustrative example, the CARM may be encapsulated as part of the application/library binary image using public/private key encryption or digital signing. A typical embodiment would use a structured data format such as XML.

In order to ensure that the CARM is authentic, each CARM is preferably digitally signed. In one embodiment, application developers have their CARMs signed by a trusted third party, or the system vendor. As one example, a prototype used compressed XML as the data format for the resource manifest. For digital signing, using a public/private key encryption scheme is an obvious choice. Other data format may also be used for the CARM.

An example resource manifest is given below:

```
<?xml version="1.0" standalone="yes" ?>
<!—CERTIFIED ACCESS CONTROL AND RESOURCE MANIFEST
-->
<IOPorts>
    <Port bytes="4">0x3f8</Port>
</IOPorts>
<PciDevice vendor=0x10EC device=0x8167>
    <MappedIOMemory>*</IOMemory>
    <ICU>45</ICU>
</PciDevice>
<Quotas>
    <RAM>1G</RAM>
    <IPCGates>10</IPCGates>
    <Semaphores>UNLIMITED</Semaphores>
    <IRQs>100</IRQs>
</Quotas>
<Permissions>
    <Service access="allow">rtc</Service>
    <Service access="deny">*</Service>
</Permissions>.
```

As previously discussed, one aspect of the CARM is that it can provide a specification of both access control (i.e., what services can be invoked by the application) and of the resource quotas. The exact syntax and content of specification is not specific to these examples. An exemplary implementation would include a flexible hierarchical data format (such as XML) that is able to incorporate wildcard (resource subsets) and other more complex definitions. The CARM specification may also include indirect specifications—for example, the above excerpt includes granting access to the physical memory regions that are reported by the Peripheral Component Interconnect (PCI) configuration sub-system (since the application cannot predict in advance what these regions would be). In one embodiment, the PCI configuration space access is incorporated into the TCB either as part of the Resource Manager or as part of an additional trusted entity.

Alternate Embodiments

Although primary embodiments of the present invention are aimed at microkernel based designs that are naturally decomposed into component-based services that can be distributed across a multi-core/many-core processor, the present invention can also be used in the context of monolithic kernel designs such as Linux, Solaris® and Microsoft Windows®. A suitable implementation would have to provide user-level resource managers that can interact with the kernel on behalf of an application. This might require modifications to existing kernel APIs to support such "delegated calls". An example would be that a resource manager would be able to request memory allocation from the kernel and pass this allocation to the application. Access Control Lists (ACLs), or other access control measures, would also need to be put in place in order to prevent applications making invocations on the kernel directly.

Although the primary embodiment of the invention would use digital signatures to authenticate application manifests of the CARM, other secure data approaches may be adopted, including the use of hardware.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of OSs, programming languages, computing platforms, computer programs, and/or general purpose machines. The present invention may also be tangibly embodied as a set of computer instructions stored on a computer readable medium, such as a memory device.

What is claimed is:

1. A method of controlling access of a plurality of applications to resources in a multi-core or many-core processor system, comprising:
   receiving, by the multi-core or many-core processor system, from each application, a corresponding trusted secure specification defining resource quotas and access privileges of the application; and
   for each application loaded in the multi-core or many-core processor system, utilizing at least one trusted proxy of the multi-core or many-core processor system to interact with an operating system kernel of the multi-core or many-core processor system to manage access to the resources for the application based on a corresponding trusted secure specification.

2. The method of claim 1, wherein:
   each trusted proxy is a resource manager that is part of a trusted computing base of the multi-core or many-core processor system, the trusted proxy separated from the operating system kernel, and the trusted proxy preventing direct access of an application loaded in the multi-core or many-core processor system to the operating system kernel, thereby preventing a denial-of-service attack on the operating system kernel by the application.

3. The method of claim 1, wherein the resources include processor resources, hardware resources, memory resources, and software services.

4. The method of claim 1, further comprising:
   for each application, utilizing a corresponding trusted secure specification to provide guidance on resources the application requires at runtime.

5. The method of claim 1, wherein, for each application, a corresponding trusted secure specification is attached to the application and is made accessible to a trusted proxy in response to loading of the application.

6. The method of claim 1, wherein:
   for each application:
      resource quotas defined in a corresponding trusted secure specification include information identifying resources the application requires at runtime and how much of the resources the application requires; and
      access privileges defined in the corresponding trusted secure specification include information identifying what services the application is allowed to invoke at runtime.

7. The method of claim 6, wherein:
   each corresponding trusted secure specification is signed by a trusted party; and
   each trusted party is a system vendor.

8. A non-transitory computer readable medium having instructions which when executed on a compute perform a method of controlling access of an application to resources in a multi-core or many core processor system, the method comprising:
   receiving a trusted secure specification defining resource quotas and access privileges of the application; and
   in response to loading of the application in the multi-core or many-core processor system to implement a process on the multi-core or many-core processor system, utilizing a resource manager of the multi-core or many-core processor system as a trusted proxy to interact with a microkernel of the multi-core or many-core processor system for managing access to the resources for the application based on the trusted secure specification.

9. The computer program product of claim 8, wherein the resources include processor resources, hardware resources, memory resources, and software services.

10. The computer program product of claim 8, wherein:
    the resource quotas defined in the trusted secure specification include information identifying resources the application requires at runtime and how much of the resources the application requires; and
    the access privileges defined in the trusted secure specification include information identifying what services the application is allowed to invoke at runtime.

11. The computer program product of claim 10, wherein:
    the trusted secure specification is signed by a trusted party; and
    the trusted party is a system vendor.

12. A method, comprising:
    providing a software application executable on a many-core or multi-core processor system; and
    attaching to the software application a trusted secure specification defining resource quotas and software service access privileges of the software application, wherein the many-core or multi-core processor system utilizes a resource manager of the many-core or multi-core processor system to interact, as a trusted proxy, with a microkernel of the many-core or multi-core processor system to manage access to resources for the software application based on the trusted secure specification.

13. The method of claim 12, wherein the resources include processor resources, hardware resources, memory resources, and software services.

14. The method of claim 12, wherein:
    the resource quotas defined in the trusted secure specification include information identifying resources the application requires at runtime and how much of the resources the application requires; and
    the access privileges defined in the trusted secure specification include information identifying what services the application is allowed to invoke at runtime.

15. The method of claim 14, wherein:
    the trusted secure specification is signed by a trusted party; and
    the trusted party is a system vendor.

16. A many-core or multi-core processing system including:
    a set of processor cores and an associated memory;
    a microkernel; and
    a plurality of trusted resource managers acting as proxies to isolate a plurality of applications from direct access to resources from the microkernel;
    wherein the plurality of trusted resource managers are trusted to allocate the resources and permit access to services for each application based on a corresponding trusted secure specification defining resource quotas and access privileges of the application, such that the plurality of trusted resource managers are utilized as trusted proxies to interact with the microkernel to manage access to the resources for each application based on a corresponding trusted secure specification; wherein each trusted resource manager is part of a trusted computing base of the many-core or multi-core processing system.

17. The system of claim 16, wherein each trusted resource manager is separated from the microkernel, and each trusted resource manager prevents direct access of an application loaded in the many-core or multi-core processing system to the microkernel, thereby preventing a denial-of-service attack on the microkernel by the application.

18. The system of claim 16, wherein the resources include processor resources, hardware resources, memory resources, and software services.

19. The system of claim 16, wherein:
for each application:
- a corresponding trusted secure specification is used at runtime to provide guidance on resources the application requires at runtime;
- resource quotas defined in the corresponding trusted secure specification include information identifying resources the application requires at runtime and how much of the resources the application requires; and
- access privileges defined in the corresponding trusted secure specification include information identifying what services the application is allowed to invoke at runtime.

20. The system of claim 16 wherein, for each application, a corresponding trusted secure specification is attached to the application and is made accessible to a trusted proxy in response to loading of the application.

* * * * *